United States Patent [19]

Carlson

[11] Patent Number: 4,505,226
[45] Date of Patent: Mar. 19, 1985

[54] LITTER-CLEANING ANIMAL LITTER BOX

[76] Inventor: Greg A. Carlson, 223 Hickok Rd., New Canaan, Conn. 06840

[21] Appl. No.: 580,011

[22] Filed: Feb. 14, 1984

[51] Int. Cl.³ .............................................. A01K 29/00
[52] U.S. Cl. .................................................... 119/1
[58] Field of Search .................................... 119/1, 19

[56] References Cited
U.S. PATENT DOCUMENTS

| | | | |
|---|---|---|---|
| 3,141,441 | 7/1964 | Russell | 119/1 |
| 3,796,188 | 3/1974 | Bradstreet | 119/1 |
| 3,809,013 | 5/1974 | Rigney et al. | 119/1 |
| 4,217,857 | 8/1980 | Geddie | 119/1 |

Primary Examiner—Jay N. Eskovitz

[57] ABSTRACT

A litter-cleaning animal litter box is comprised of two substantially identical nestably stacked animal litter receptacles, with aperture means at their bottoms sized to permit the passage of litter but retain solid waste. A false bottom, to which wetted litter adheres, is fitted into each receptacle. Litter is placed into the upper receptacle-false bottom combination. A retaining edge that keeps the cat from scratching litter from the box when instinctively digging and covering is press fitted onto the peripheral shoulder of the upper receptacle. The upper receptacle-false bottom combination serves as a litter and waste holding means. The lower receptacle-false bottom combination serves as a strained litter receiving means. When operated, the retaining edge is removed and set aside. The false bottom in the upper receptacle is removed along with the adhering wetted litter. The false bottom is vibrated, scraped, wiped, washed, or otherwise mechanically worked in order to remove the adhering litter for disposal. The upper receptacle is then moved back and forth, and to and fro to make the litter fall through the receptacle's aperture means into the lower receptacle-false bottom combination. Solid waste is retained in the upper receptacle and discarded. The cleaned false bottom is replaced into the cleaned receptacle. The receptacle-false bottom combination now containing the cleaned litter is nestably stacked into the reassembled just-cleaned combination. The retaining edge is pressed onto the peripheral shoulder of the now upper receptacle, litter added to replace that discarded during cleaning, and the litter-cleaning animal litter box is again ready for service.

20 Claims, 7 Drawing Figures

LITTER-CLEANING ANIMAL LITTER BOX

FIELD OF INVENTION

The present invention relates to a litter-cleaning animal litter box and primarily, but not by way of limitation, to a litter-cleaning cat litter box constructed and arranged to enable the substantially complete removal of both solid and liquid wastes from the unsoiled litter.

DISCUSSION OF PRIOR ART

Cat litter boxes give cats a location in the cat owner's living quarters where the animals can relieve themselves of bodily wastes in a manner acceptable to both the cats and their owners. It is natural for a cat to use the outdoors for relief of bodily wastes but when access to the outdoors is restricted, a litter box is necessary to preclude the cat from using the owner's living quarters at large. Because of bad weather when the cat refuses to go out, times when a cat is locked in and unable to get out, or when a cat is an apartment dweller, a litter box is a necessity. The existence and use of cat litter boxes presents some problems.

Litter boxes must somehow be cleaned. Many cats will not use a dirty box, thus defeating the purpose of the box. Additionally, a dirty litter box may become a considerable source of foul odor which pollutes the living quarters of the cat owner and causes him or her discomfort and many times outright embarassment.

To solve these problems, a cat litter box may be completely dumped of its contents of wastes and litter, cleaned, and refilled with fresh litter. The cleaned box is then readily used by the cat again, and if changed at frequent intervals there is little odor to contend with. Unfortunately, complete changing of the box at intervals frequent enough to make both the cat and owner happy is not a workable solution for many cat owners.

Because of the large amount of litter required for frequent changing, and the associated costs, need for frequent dumping, and the requirement of purchasing and transporting the litter, the total dumping alternative is generally not workable or desirable.

Prior art has tried to solve the problem in a number of ways. Most prior art details some kind of screening device which separates solid wastes from the litter, but does not enable workable removal of the wetted litter. The most widely used commercial device probably is an over-sized slotted spoon designed to allow one to scoop out wastes from the litter at large. This method is tedious, unpleasant, and incomplete at best, leaving behind wastes, especially odor-generating wetted litter. Prior art also details methods that are designed to be odor-absorbing, odor-masking, or odor-containing, in order to deal with the problem brought about by incomplete cleaning of the litter. Scented deodorant litters and deodorizers attempt to mask odor, superabsorbent litters and charcoal filtering elements attempt to absorb odor, and enclosed litter boxes attempt to contain odor.

Besides the problems of cleaning and odor, another problem is keeping litter in the box against the animal user's instinctive digging and covering. Prior art has substantially solved the problem by detailing retaining edges and enclosing covers which fit over the box and keep the litter from being scratched out.

OBJECTS OF THE INVENTION

Prior art does not detail a device which, in my opinion, adequately addresses the problems of cleaning and the associated odor problem that results from the present incapability of the art to provide a thorough, workable cleaning method. Accordingly, the present invention is constructed and arranged to enable the substantially complete removal of both solid and liquid wastes from the unsoiled litter.

The present invention makes litter box cleaning fast, simple, tidy, and substantially complete, thereby controlling odor and making for the economical use of litter. Additionally, the preferred embodiment of the device includes a retaining edge from the prior art that keeps the litter from being thrown out of the box by the animal when it is digging and covering. The objects and advantages of the present invention are detailed more specifically as follows.

Odor is controlled by the elimination of odor-causing elements. The pet owner is happy since the household odor problem and any accompanying embarassment or discomfort is eliminated. Additionally, the pet animal will be more likely to use the box.

By virtue of the present invention being fast, simple, tidy, and thus convenient, the pet owner will be more likely to clean the box, and in turn the pet animal will be more likely to use it.

Additionally, the removal of wastes results in a cleaner environment for the pet animal as well as the owner.

Finally, as will be seen clearly in the description and operation, the device operates in such a way as to save litter when compared to prior art. Since usable litter that would otherwise have been discarded is retained for future use, the device is more efficient than prior art. As a result, cost of operation is lower because less litter is used. Additionally, less litter use results in an ecologically sound product since less used litter is then discarded.

Further objects and advantages of the present invention will become apparent from a consideration of the drawings, description, and operation.

DESCRIPTION OF THE PREFERRED EMBODIMENT

It is important to note the meaning of the following terms as used to describe the preferred embodiment. "Litter box" means the complete device. "Receptacle"

means container. The receptacle functions as a container for holding litter and wastes. The receptacles in the preferred embodiment are referred to as "pans", by which it is meant substantially rectangular receptacles each with a bottom and four upstanding peripheral sides. "False bottom" refers to a member used primarily to remove wetted litter and which includes a substantially flat plate portion, an upstanding side portion, and a laterally-extending flange portion that serves as a handle. By "litter" it is meant a granular material that serves as a waste holding media into which the animal may deposit bodily wastes. For the preferred embodiment dried clay that is commercially sold as cat litter is preferred, provided that it will adhere to the false bottom when wetted. The term "mechanically worked" refers to the washing, wiping, vibrating, scraping, or other action to which the false bottom is subjected in order to remove the adhering wetted litter for disposal. "Wetted litter" means animal litter made wet by coming into contact with cat urine. "Solid wastes" means cat feces. "Liquid wastes" means cat urine. "Unsoiled litter" means that animal litter within the litter receptacle that is substantially uncontaminated. The volume of unsoiled litter may constitute the bulk of the receptacle contents. Separation of the wastes from the substantially uncontaminated litter defines the main functional operation of the present invention and its embodiments. Thus the phrase "to enable the substantially complete removal of both solid and liquid wastes from the unsoiled litter".

Figure 1:
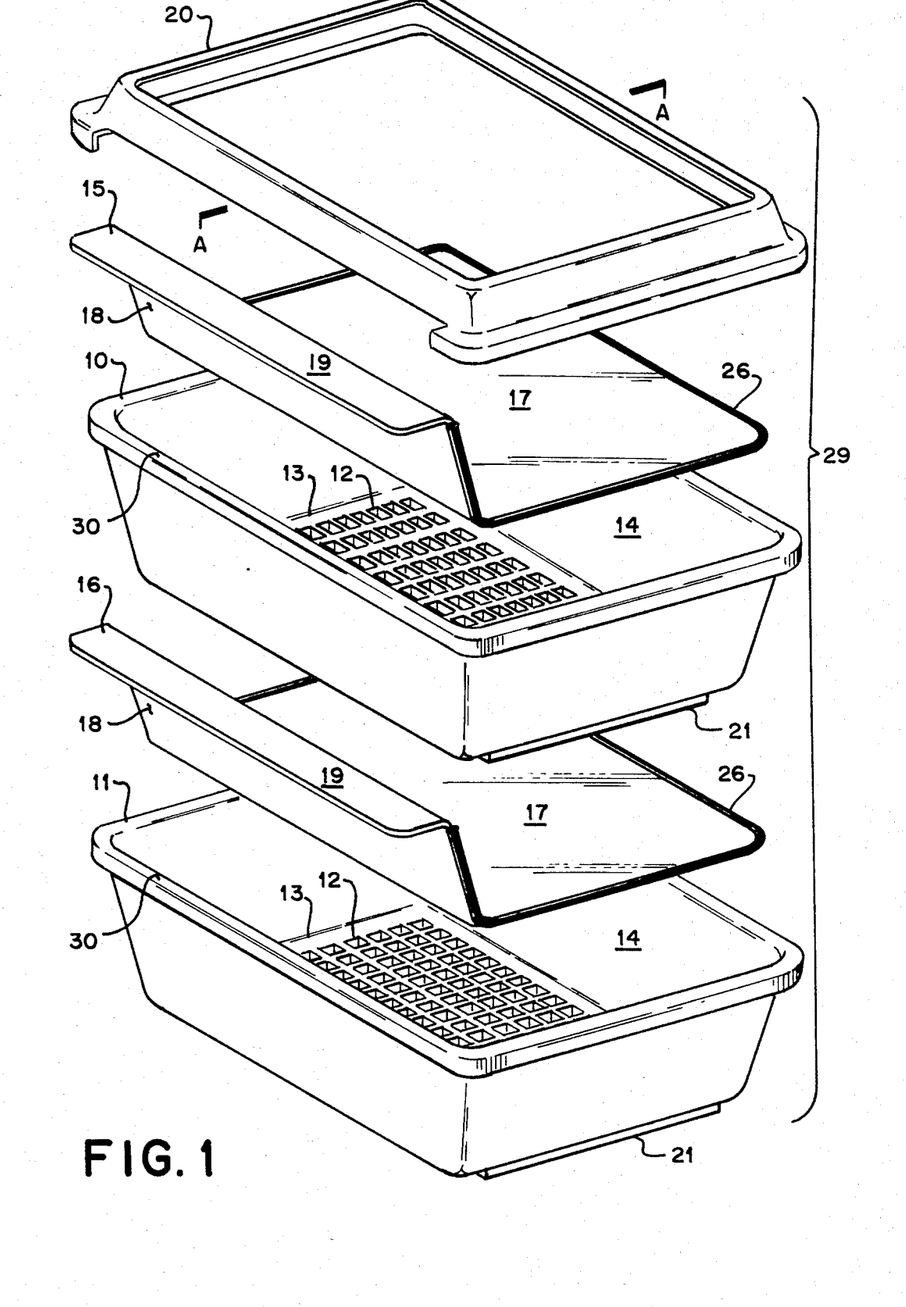
FIG. 1 is an exploded perspective view of the preferred embodiment of the litter-cleaning animal litter box.
Figure 2:
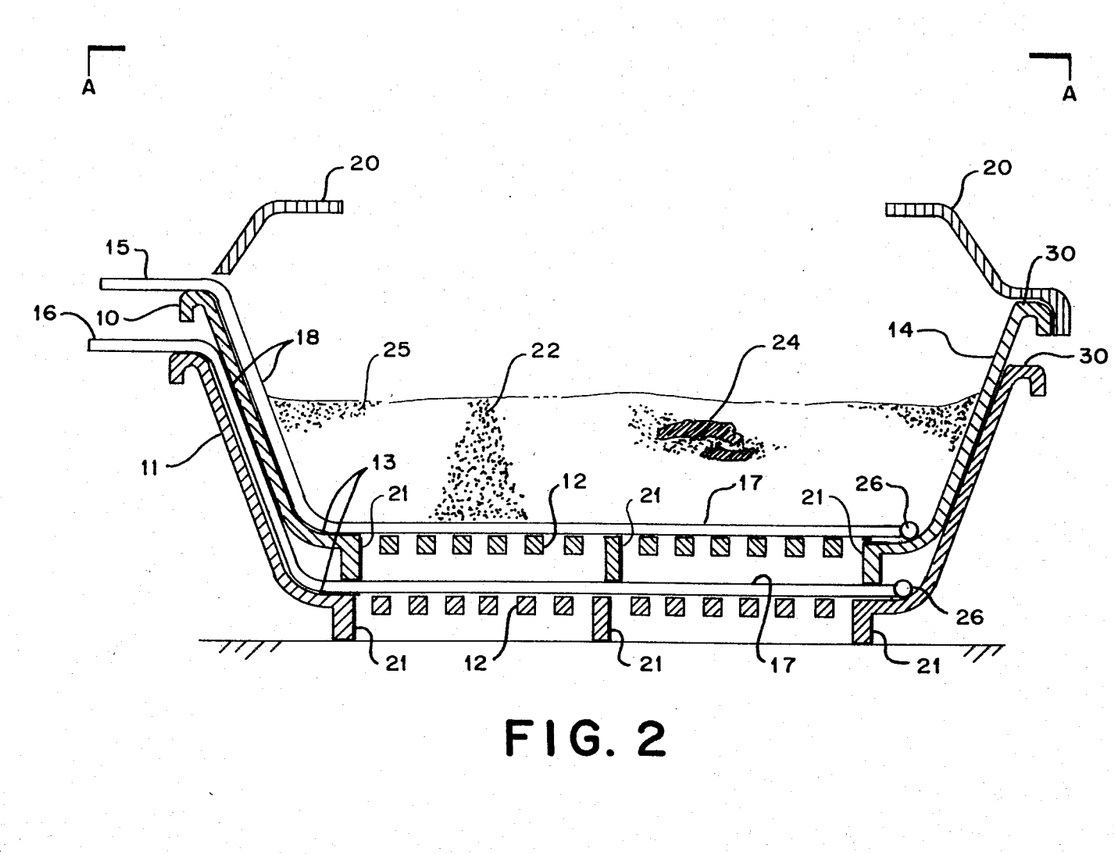
FIG. 2 is a cross-sectional view of FIG. 1 taken at A—A, with the component parts in assembled relationship, showing the box with litter and wastes.

Preferrably, although not by way of limitation, the present invention consists of two substantially identical, interchangeable pans, 10 and 11, and two substantially identical, interchangeable false bottoms, 15 and 16. Additionally, one retaining edge 20 not claimed as my invention, is included in the device in order to keep the cat from throwing litter 25 from the pans during instinctive digging and covering.

The pans hold the litter and wastes and act as transportation containers for solid waste during the disposal process. Each pan is substantially rectangular with a bottom portion 13, four upstanding outwardly-sloping side portions 14, and an upper peripheral shoulder 30. Additionally, each pan has holes 12 in its bottom 13, integral ribs 21 projecting externally from the bottom 13, and is molded out of polypropylene plastic or a suitable synthetic polymer or any suitable non-corroding impact-resistant material. The pans are configured and sized specifically for each type of animal application, and for average cats the preferred size is approximately 18 inches by 14 inches by 4 inches deep, although other sizes are appropriate. For large persians or other large breeds a larger size is indicated in many cases, for example.

Although a rectangular pan is preferred, pans of other configurations are appropriate. Pans which are circular, triangular, hexagonal, and even shaped like the outline of a cat, are examples.

The holes 12 in each pan 10 and 11 screen the solid waste 24 from the litter 25, and are thus sized to permit all commercial clay cat litter known to me to pass through rapidly, while retaining the solid animal waste. A hole 12 size of 9/32 inch square is preferred, as it optimizes the trade-off between sifting speed and solid waste 24 retention. Square holes are preferred to facilitate tool-making for manufacture by injection molding. Rectangular holes or holes of other size or configuration may be employed successfully, as long as they are designed to pass litter yet retain solid waste. Additionally, a screen or perforated plate that is attached to or molded as part of each pan bottom, is another way in which to provide a means for separating solid waste from the litter. The preferred method, however, is to mold the holes into the bottom of each pan during manufacture.

The sides of each pan 10 and 11 are sloped outwardly in order to ensure alignment and sealing of each false bottom 15 and 16 into each pan 10 and 11, respectively. When the false bottom is moved downward in the pan, the slope of the pan's sides causes compression of the false bottom gasket, resulting in the actual sealing action. Additionally, the slope of each pan's sides 14 allows the nesting of one pan 10 or 11 inside the other, giving a minimized unit height for ease of animal entry. The slope of each pan's sides also imparts rigidity and strength, catches any overspill or spill-off when removing the false bottom from the pan during cleaning, and provides ease in packaging and transportation of the finished product. The slope of each pan's sides also enables easy removal of the pan from an injection mold thereby facilitating manufacture.

The integral projecting ribs 21 of each pan 10 and 11 help ensure geometric sealing of each false bottom 15 and 16 into each pan 10 and 11, respectively. The ribs 21 allow the linkage of the motion required to seal a false bottom 16 into place in the lower pan 11, with the action of replacement of the upper pan 10, resulting in a highly reliable and rapid sealing operation, and rapid overall unit operation. When the pans 10 and 11 and their respective false bottoms 15 and 16 are stacked, the ribs 21 serve to elevate the upper pan 10, thereby enabling easy separation of pans for cleaning. The ribs 21 also increase the rigidity of each pan 10 and 11 thereby making it more difficult for the false bottoms 15 and 16 to come out of sealing contact with their respective pans when the pans are flexed by forces applied during cleaning.

The pans 10 and 11 are preferably made of polypropylene plastic to enable molding and for low cost, durability, chemical resistance, and cleanability.

Figure 3:
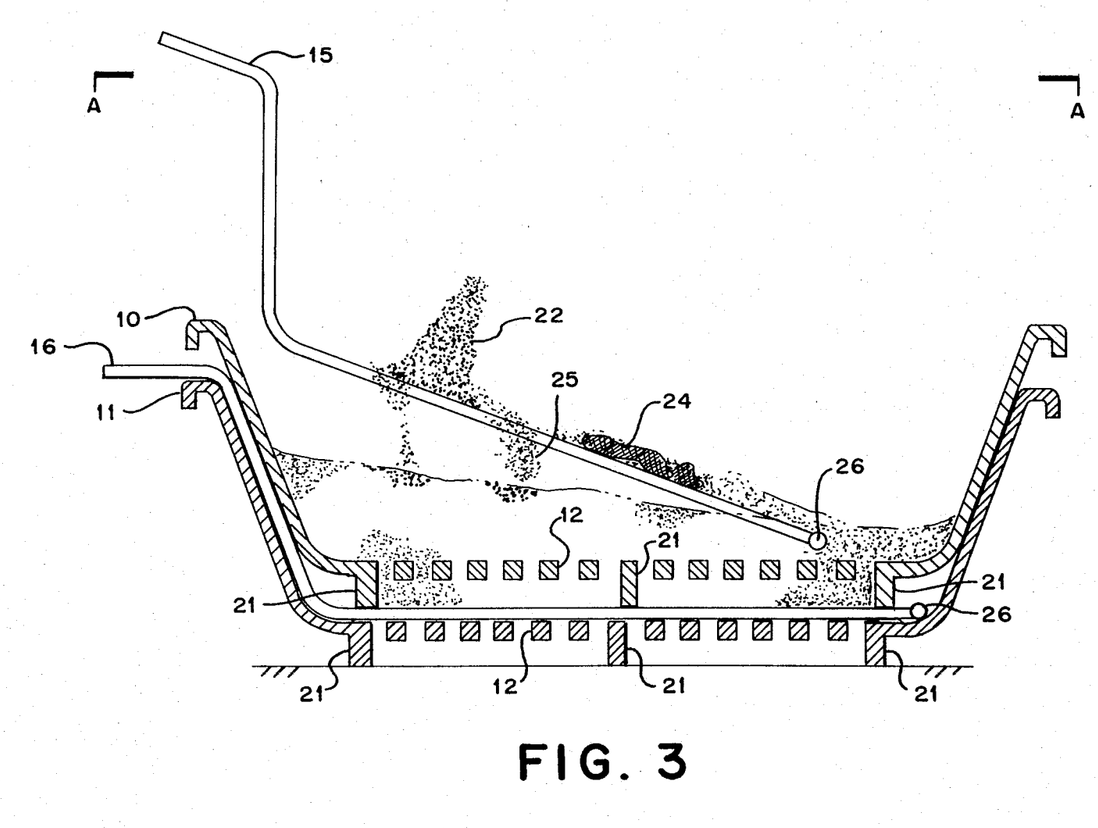
FIG. 3 is a cross-sectional view of the preferred embodiment, similar to FIG. 2, showing wetted litter adhering to the substantially rigid false bottom, as the false bottom is removed from the upper receptacle.

Substantially rigid false bottoms 15 and 16 which are configured to fit the contours of each pan, act primarily as elements to facilitate the removal of wetted litter 22 from the unsoiled litter 25 and solid waste 24 in the pans 10 and 11. They are preferably made of an impact grade of polystyrene plastic. The false bottoms 15 and 16 are preferably either made from extruded plastic sheet which is heated locally and bent to form, or from plastic profile extrusions which are cut to length. In either case, corner radii are then made by die cutting or band sawing. The false bottoms may also be molded or formed with structural ribbing giving the necessary rigidity with minimum material usage.

The wetted litter adheres to whichever false bottom is in the upper pan. The mechanical attachment of the wetted litter 22 to the false bottom 15 or 16 enables removal of the wetted litter from the bulk of solid waste 24 and unsoiled litter 25, by removal of the false bottom from the pan 10 or 11.

Changes in false bottom surface texture and contour may facilitate mechanical attachment of wetted litter, but were determined by experiment to be unnecessary when using the preferred material. Such changes may prove necessary and desirable when working in other materials or with other configurations.

The false bottoms 15 and 16 must be substantially rigid. When being removed from the pan 10 or 11 a false bottom of insufficient rigidity will flex and thus the wetted litter 22 may fall off into the pan before it can be removed. Once in the pan, the wetted litter may be substantially unrecoverable, and may serve to contaminate the bulk of the litter, resulting in a shorter usable litter life. For an approximately 18 inch by 14 inch pan, a false bottom constructed from ⅛ inch thick high impact polystyrene plastic sheet has sufficient rigidity to reliably ensure that the wetted litter will not fall off the false bottom when the false bottom is removed from the pan during cleaning.

The false bottoms 15 and 16 are configured to fit the contours of the pans 10 and 11. Such configuration ensures sealing, easy removability, and avoidance of spills during cleaning. Preferred false bottom configuration includes a substantially flat plate portion 17, an upstanding side portion 18, and a laterally-extending flange portion 19 that serves as a handle.

When wetted litter 22 rests against both the pan's sides 14 and false bottom 15 or 16, proper false bottom configuration makes wetted litter adhere with sufficient adhesion to preclude adherence of wetted litter to the pan sides in any significant amount, when the false bottom is removed during cleaning. Contoured configuration keeps the pet animal from catching its claws on the false bottom 15 or 16 or in the holes 12 in the pan bottom 13.

The false bottoms 15 and 16 additionally keep the pan contents from passing through the pan holes 12 until desired, and prevent the pan holes from being clogged by wetted litter 22 and solid waste 24 when the pan 10 or 11 is in a static condition.

The false bottoms 15 and 16 are preferably made of an impact grade of polystyrene plastic. A smooth sheet of plastic, a profile extrusion, or a molded or formed part, configured to fit each pan 10 and 11, provide the necessary adhesive surface characteristics sufficient for the mechanical attachment of wetted litter 22 to the false bottoms. Low cost of material, ease of manufacture, colorability, chemical and corrosion resistance, cleanability, and durability under the mechanical working required to clean the false bottom 15 or 16, are other reasons for the choice of an impact grade of polystyrene plastic as the preferred material.

The false bottoms 15 and 16 include a peripheral rubber gasket 26. A closed-cell sponge rubber gasket 26 is adhesive bonded to the edge of each false bottom 15 and 16. The gasket 26 takes up allowances between each mated pan and false bottom, 10 and 15, and, 11 and 16, respectively, in order to form a sealing junction that prevents leakage of wastes or litter.

Closed-cell neoprene sponge rubber was chosen for low cost, low absorption of liquid waste and thus low odor retention, and because it is soft and flexible enough to allow sealing of mated parts under low contact pressure.

Adhesive bonding of the gasket 26 to the false bottoms 15 and 16 is preferred because of an adhesive's ability to flex under load and thereby make such attachment strong and durable under the flection it is subjected to. Proper sealing of each false bottom 15 and 16 into each pan 10 and 11, respectively, is ensured by the uniformity of gasket attachment realized through adhesive bonding.

A retaining edge 20 not claimed as my invention, keeps the cat from scratching the litter 25 out of the pan 10 or 11 when instinctively digging and covering. The retaining edge 20 is preferably made of the same material as the pans 10 and 11 for the same reasons. The retaining edge 20 is secured to the peripheral shoulder 30 of the upper pan 10 by a press fit. In order to avoid possible injury, the retaining edge 20 is made dull at all possible points of pet animal or animal owner contact.

OPERATION

In assembly for operation a false bottom 15 or 16 is placed in each pan 10 and 11. The two pan-false bottom units are then nestably stacked, one inside the other. The false bottoms 15 and 16 are then sealed into their respective pans 10 and 11 in turn, by pressing down upon whichever pan is on top. This motion is transferred to the false bottom of whichever pan is on the bottom, via the projecting ribs 21. The pan-false bottom units are then reversed in position, and the other false bottom is sealed into the other pan by the same operation.

For operation, the upper pan 10 is filled with a suitable commercial clay cat litter 25 to a depth of approximately one inch. It should be noted that a fairly shallow depth of litter 25 is necessary to insure proper adhesion of the wetted litter 22 to the false bottom 15 or 16 under varying conditions. Too much litter 25 in the box 29 may create sufficient sliding force to dislodge wetted litter 22 from the false bottom 15 or 16 when removing the false bottom from the pan 10 or 11 during cleaning. Additionally, too high a level of litter may preclude liquid waste penetration to the false bottom 15 or 16 surface and thereby result in failure of the wetted litter 22 to be attached to the false bottom and thus be removed. A one inch depth was accepted by user animals in actual tests as sufficient for digging and covering.

The retaining edge 20, if used, is then pressed onto the peripheral shoulder 30 of the upper pan 10.

Preferably once each day, when the box is in general use, it should be cleaned. More frequent cleaning should be undertaken when the box usage is high. The litter box 29 is cleaned as follows.

The retaining edge 20, if used, is removed from the upper pan 10 and set aside. The false bottom of the upper pan 15 is slowly and carefully lifted, laterally-extending flange portion 19 upward, front edge of lower plate portion 17 down. The false bottom 15 is then pulled toward the operator with as shallow an elevation as is practicable, but which ensures that dry litter 25 and loose solid waste 24 will slide off into the upper pan 10. At this point, if the user cat has urinated into the pan, a mass or masses of wetted litter 22 will be seen to adhere to the false bottom 15. Solid wastes 24 that are intermixed with the wetted litter 22, may also adhere. The false bottom 15 is then lifted completely from the pan 10 in a way that will ensure that any false bottom spill-off of litter 25 or solid waste 24 will fall into the pan 10. The false bottom 15 is then transported to a disposal site.

The false bottom 15 is then washed, wiped, scraped, vibrated, or in some other way mechanically worked so that the adhering wetted litter 22 is removed. Liquid wastes are thus removed from the unsoiled litter by removing the litter that has absorbed them.

When a false bottom is mechanically worked by vibration, under average conditions a slight trace of wetted litter or a wet spot will remain where the wetted litter used to adhere to the false bottom. When practicable, it is preferable to remove any such spots by either wiping or washing in order to eliminate any possible source of odor. Testing has shown that this usually is not necessary in order to eliminate household odor, but will extend the useful life of the litter before a complete change is required.

Figure 4:
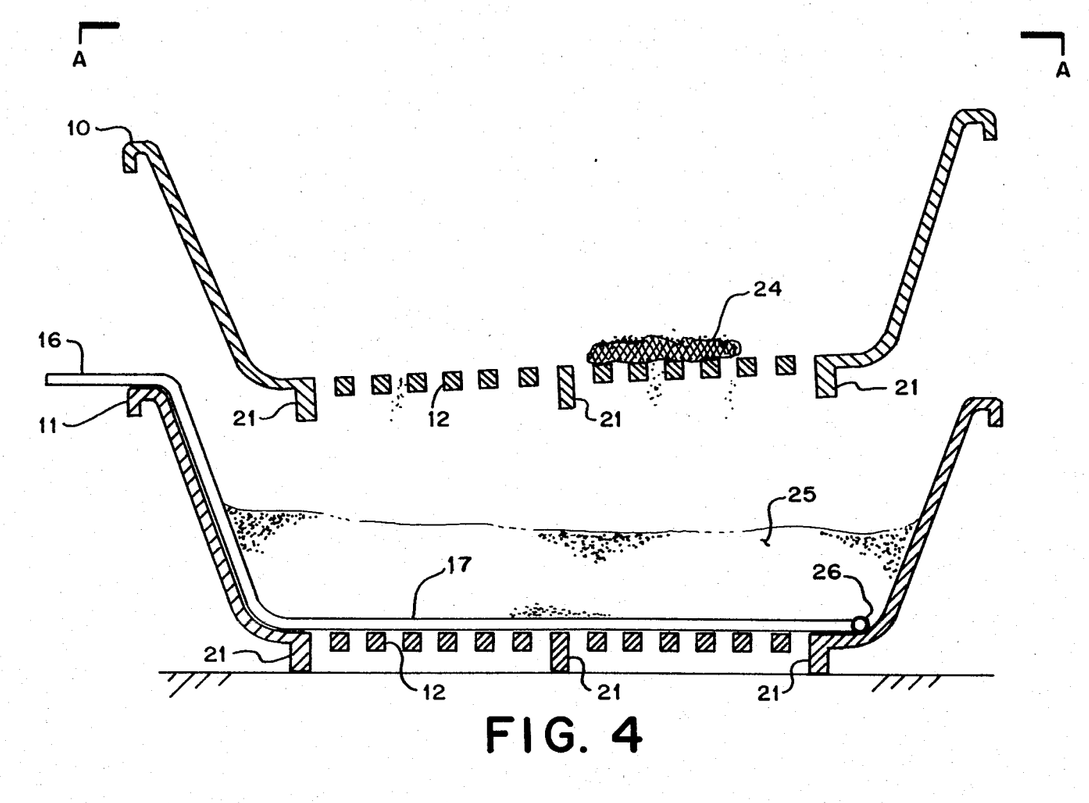
FIG. 4 is a cross-sectional view of the preferred embodiment, similar to FIG. 2, depicted after straining the litter, showing the strained litter in the lower receptacle and solid waste retained in the upper receptacle.

The upper pan 10 is then rapidly moved back and forth and to and fro against the inner sides 14 of the lower pan 11, while slowly being lifted upward. Movement of the pan 10 in this manner sets up vibrations that better enable the litter 25 to fall through the holes 12 in the bottom 13 of the upper pan 10. While sifting, the upper pan 10 is kept low in the lower pan 11 in order to minimize the introduction of fine litter dust into the air. If present, solid waste 24, being generally larger than the holes in the pan bottom 12, is retained in the upper pan 10.

The upper pan 10, now containing solid waste 24 if the cat has defacated, is carried to a disposal site and the solid waste is dumped from the pan and thus discarded. If no solid waste is present, the disposal step is of course skipped.

The cleaned false bottom 15 is now placed into the cleaned pan 10. The cat litter box 29 is now reassembled for reuse by nestably stacking the pan-false bottom units one within the other, so that the positions of the units are now reversed with the previously lower unit which now contains the cleaned litter positioned as the upper unit. The now upper pan is pressed down upon at the same time it is replaced in the now lower unit, so that the now lower pan's false bottom is sealed into place. Litter is added to replace any soiled litter that was removed.

The retaining edge 20, if used, is placed onto the peripheral shoulder of what is now the upper pan.

The cat litter box 29 is once again fully assembled and ready for service, and the cycle is repeated with each cleaning.

The litter 25 is totally changed, and pans 10 and 11, false bottoms 15 and 16, and retaining edge 20 washed when required.

If required, any part in the assembly may be accessed for cleaning at any time without the need to discard the litter, due to the interchangeability of the mechanism's parts.

It should be noted that because only the litter 25 that is actually soiled is discarded on a regular basis, litter is saved when compared to prior art. Prior art does not show a thorough and workable method for removing the wetted litter 22 from the unsoiled litter. In prior art, usable litter 25 must be discarded along with the soiled litter when cleaning the box 29 completely.

While the above description of my invention and its operation contains many specificities, these should not be construed as limitations on the scope of my invention, but rather as an exemplification of one preferred embodiment thereof. Many other variations are possible, for example are the following embodiments and considerations which represent changes in material, structure, or use, of the present invention.

Figure 7:
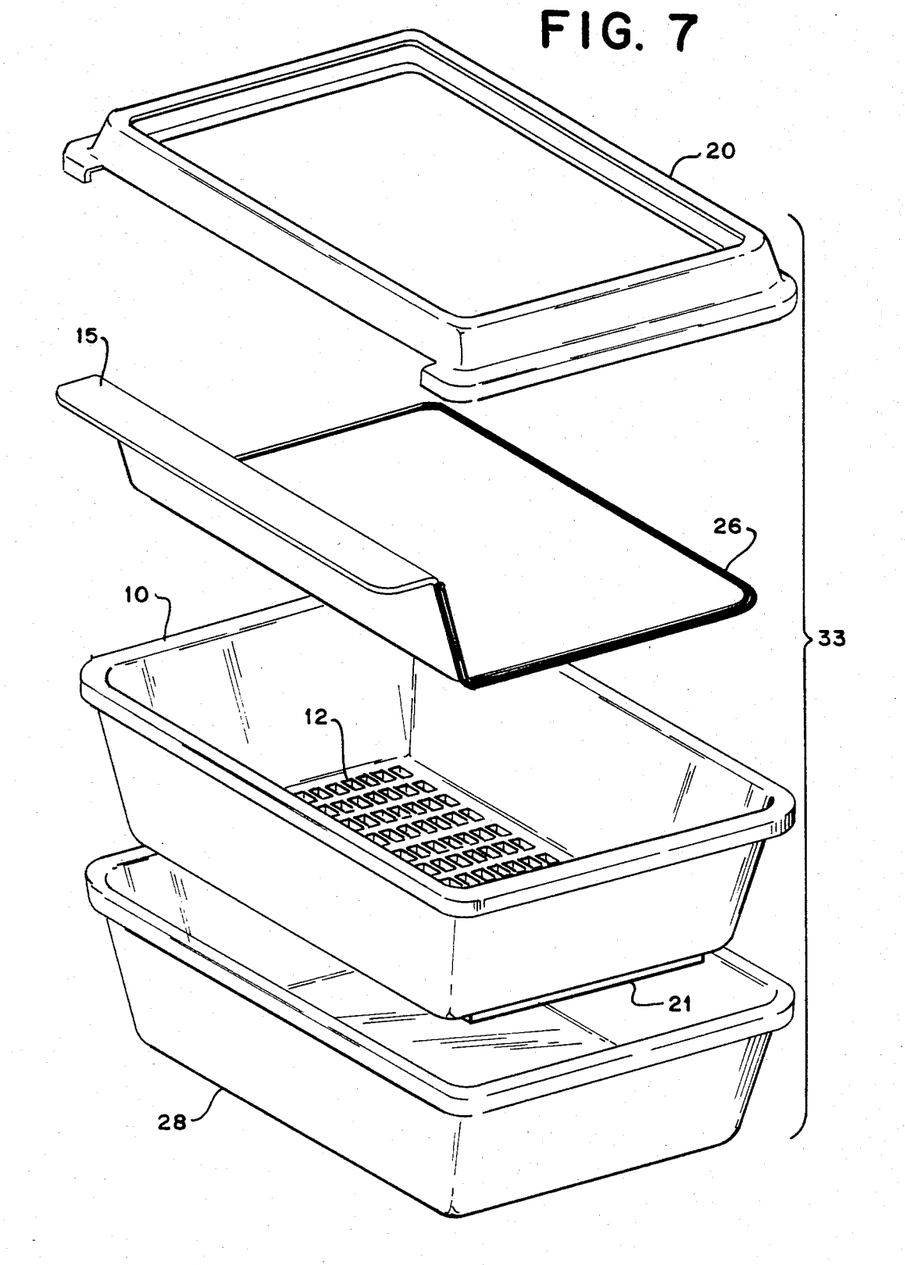
FIG. 7 is an exploded perspective view of an alternative embodiment of the litter-cleaning animal litter box.

One alternative embodiment of the present invention is the use of one pan-false bottom unit, 10 and 15, or, 11 and 16, with or without the retaining edge 20, in combination with a regular solid pan 28. This embodiment is illustrated overall as 33. By "regular solid pan" 28 it is meant a rectangular plastic pan with an imperforate bottom. Like pans are generally sold commercially as basic cat litter boxes.

The pan-false bottom combination 10 and 15, or, 11 and 16, is used as the upper pan-false bottom combination as in the preferred embodiment. The regular solid litter pan 28 takes the place of the lower pan-false bottom combination. Unit operation is like that of the preferred embodiment, except that after cleaning the litter 25, the pans 10 and 28 are not interchanged. Instead, the pan-false bottom unit, 10 and 15 combined, is reassembled, and the false bottom 15 sealed into place. Sealing is accomopolished by first introducing the front edge of the lower plate portion 17 of the false bottom into the pan, then pushing firmly down on the laterally-extending flange portion 19.

The cleaned litter 25 is then dumped from the regular solid litter pan 28 back into the pan-false bottom unit 10 and 15 combined. The regular solid pan 28 is set aside for future use, or if properly sized, the upper pan-false bottom combination may be nestably stacked into it. The pan-false bottom unit, 10 and 15 combined, may be sized to interface with products of other manufacturers, or with a mating pan of the same size, so that sifting may be accomopolished without spilling. The intimate contact between pans 10 and 11 that promotes more rapid sifting via vibration, as in the preferred embodiment, may not be practicable when the pan-false bottom unit, 10 and 15 combined, interfaces with the products of other manufacturers.

Another embodiment is to replace the retaining edge 20 of the preferred embodiment, or others, with an enclosing cover with a hole in it sized for easy animal entry. Such a cover is detailed in the prior art. Enclosing the box serves to hide the litter and any wastes from view, keeps the litter from being scratched out of the box 29 by the animal, and precludes the animal from overspraying the box while urinating.

Another embodiment is simply the use of the preferred embodiment as two separate litter boxes, 10 and 15, and, 11 and 16, with or without the retaining edge 20, with or without an enclosing cover. This use may be for multiple animals within the same household, for example.

An additional embodiment is the use of a single modified false bottom, sized to fit a regular litter pan such as 28 and designed to displace litter 25 in the pan 28 so as to facilitate false bottom replacement under the litter. A modification that enables easy replacement of the false bottom under the litter 25, such as a downwardly inclined front edge on the false bottom, is an example of false bottom modification. The leading edge would lift the litter 25 up and on top of the false bottom as it moved forward along the pan bottom. The design may include a rubber wedge attached to the leading edge of the false bottom to allow the scraping of the pan bottom and thereby further facilitate the replacement operation. The false bottom serves to remove the wetted litter from the bulk of solid wastes 24 and dry litter 25. Solid waste 24, if present, is scooped out of the pan after the false bottom is removed. After cleaning, the pan 28 is tipped slightly in order to slide the litter 25 to one side of the pan so that the false bottom may be reintroduced under the litter, and thereby the modified false bottom is reset for use in another cleaning cycle.

Another conception is a regular solid pan modified so that it contains a litter-holding pocket or area, which when tipped on an angle stores the litter after cleaning and before reinsertion of the false bottom, 15 or 16. The pocket may be movable or integral with the pan and non-moving. This concept is essentially a simpler method for reinserting the false bottom, 15 or 16, as compared to the previous embodiment, and would additionally not require a modified false bottom.

Another embodiment employs two solid pans 28, each with a false bottom. Cleaned litter is simply dumped from one pan to the other pan-false bottom unit. This serves to remove the wetted litter, but does not remove the solid waste, which still must be scooped out. This method however eliminates the need for a modified false bottom.

Another embodiment is the use of throwaway false bottoms made of cardboard, paper, or any other suitable material which is low in cost and to which wetted litter will adhere. These would be used in the preferred embodiment or in any other. A throwaway false bottom eliminates the need for cleaning the false bottom. Any possible source of odor is thrown away with the false bottom. Wetted litter is known to adhere to cardboard or paper, in addition to an impact grade of polystyrene, but any other material found suitable to which wetted litter adheres may be used.

Figure 5:
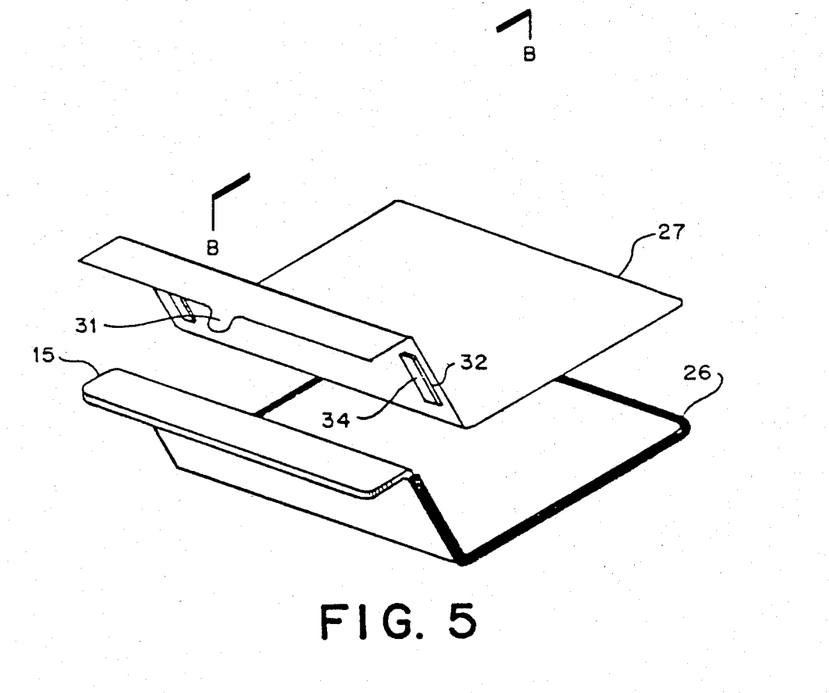
FIG. 5 is an exploded perspective view of a false bottom and a mating throwaway liner.
Figure 6:
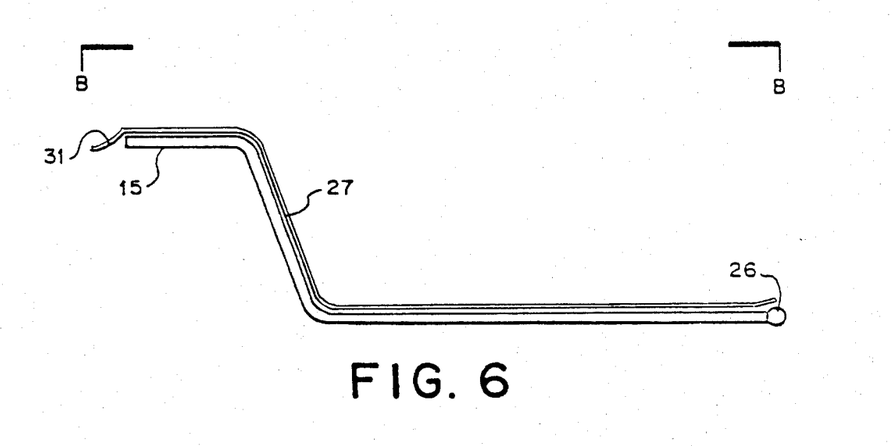
FIG. 6 is a cross-sectional view of FIG. 5 taken at B—B, with the components in assembled relationship.

Still another embodiment of the invention is the use of throwaway liners or covers 27 which are carried by the false bottom 15 or 16, and made of paper, cardboard, plastic, or any other suitable material. The covers attach to or fit over the substantially rigid false bottoms 15 and 16 of the preferred embodiment, or are usable in any of the embodiments where their use is logically consistent. Because the rigidity of the assembly is provided by the underlying false bottom 15 or 16, the covers 27 need only contain a small amount of material and therefore are inexpensive. An example of a preferred design for such a cover or liner is a piece of coated paper or cardboard which overlays the substantially rigid false bottom 15 or 16, and may contain a tab 31 on its top portion. The cover 27 may be temporarily attached to the false bottom via adhesive strips 32 on the cover's back, or by other means. Each adhesive strip 32 may contain a cover 34 which is pulled off, and the liner is then pressed into place onto the false bottom. An adhesive strip cover 34 may not be necessary when the adhesive is pressure-actuated. The tab 31 at the top is pulled toward the front edge of the plate portion of the false bottom 15 or 16 in a parallel direction in order to remove the cover 27 from the false bottom for disposal. A large variety of liner configurations are possible. A tab may not be needed since a notch or a liner flange portion that overextends the false bottom flange portion may be employed, for example.

It should be noted that a regular as-produced commercial surface is adequate to ensure proper adhesion of wetted litter to a false bottom when working in the preferred material. However, changes in false bottom surface texture, material, or configuration, may be required or desirable, and are fully within the scope of the invention.

Any alternative materials that are found suitable may be employed for any of the parts of any embodiment. However, for the false bottom component an absolute requirement is that either the material or the characteristics of the manufactured part's configuration, or both, enable the mechanical attachment of wetted litter to the false bottom.

The gasket 26 on the false bottom may be made of any suitable type of resilient material. Rubber, fabric, natural or manmade material are some examples.

For the preferred embodiment, a gasket is necessary to prevent leakage. It should be noted that a gasket on the false bottom may not be necessary, since such a gasket may be placed on the inside of the pan. Additionally, no gasket at all is required when the configuration of the pan, false bottom, or both, act singly or in combination to retain leakage. Also, if such a design is used, ribbing on the pans may not be necessary. A pan with a trough on the inside perimeter of its bottom, in combination with a false bottom having deflected edges or a bead at its periphery that fits into the trough, is an example of the pan and false bottom being configured to retain leakage without the need for a gasket. In such a case, a pan need not have outwardly-sloping sides. Additionally, an inner ridge that is raised, located on the inner perimeter of the pan bottom, which, along with the pan side forms a containment area, is another example of a configuration that obviates the need for a gasket. Also, a separate part which acts as a gasket but which is not attached permanently may be employed.

When a retaining edge is not employed in the design, the pans need not have an upper peripheral shoulder.

The composition of the litter is only confined to any suitable material that when wetted will adhere to the false bottom. Commercial dried clay sold for use as cat litter is preferred.

Additionally, any or all of the basic elements of my invention may be combined and used, in modified form, in conjunction with cages and without, as a litter box for other animals such as rabbits, guinea pigs, hamsters, birds, and others, where appropriate, while keeping with the original spirit and principles of the invention.

The scope of the invention should be determined not by the embodiments illustrated and described, but by the appended claims and their legal equivalents.

I claim:

1. In combination with animal litter receptacle means: False bottom means adapted to be positioned in said receptacle means whereby said receptacle and false bottom means are cooperatively adapted to receive and hold animal litter, said false bottom means being constructed and arranged so as to be substantially rigid over that portion thereof that engages and supports said animal litter and made from a material having the necessary adhesive characteristics and configured so that the wetted litter engaging said portion of said false bottom means will ahdere thereto so that said false bottom means can be removed from said receptacle means contents and mechanically worked whereby said wetted litter is then released from said false bottom means for disposal, said false bottom means being constructed and arranged so as to be substantially rigid over that portion thereof that engages and supports said animal litter so that said portion of said false bottom means will not flex sufficiently to release said wetted litter during removal of said false bottom means from said receptacle means contents.

2. The structure defined in claim 1, wherein said false bottom means comprises a lower plate portion, an upstanding side portion, and a laterally-extending flange portion that serves as handle.

3. The structure defined in claim 1, wherein said false bottom means is configured to substantially fit the contours of said receptacle means.

4. The structure defined in claim 1, wherein said false bottom means includes a peripheral gasket means that is adapted to engage the inner surface of at least a portion of said receptacle means.

5. The structure defined in claim 1, wherein said false bottom means includes discardable liner means carried by said false bottom means.

6. The structure defined in claim 1, wherein said false bottom means is made of plastic.

7. The structure defined in claim 4, wherein said peripheral gasket means is made of resilient material.

8. An animal litter box constructed and arranged to enable the substantially complete removal of both solid and liquid wastes from the unsoiled litter comprising:
- a first animal litter receptacle means having aperture means at the bottom thereof; and,
- a second animal litter receptacle means having an imperforate bottom, said receptacle means being adapted to be combined so that said first receptacle means acts as litter straining means and said second receptacle means acts as strained litter receiving means; and,
- false bottom means adapted to be positioned in said first receptacle means whereby said first receptacle means and false bottom means is adapted to receive and hold animal litter, said false bottom means being constructed and arranged so as to be substantially rigid over that portion thereof that engages and supports said animal litter and made from a material having the necessary adhesive characteristics and configured so that the wetted litter engaging said portion of said false bottom means will adhere thereto so that said false bottom means can be removed from said first receptacle means contents and mechanically worked whereby said wetted litter may be released from said false bottom means and discarded, said false bottom means being constructed and arranged so as to be substantially rigid over that portion thereof that engages and supports said animal litter so that said portion of said false bottom means will not flex sufficiently to release said wetted litter during removal of said false bottom means from said first receptacle means contents.

9. The structure defined in claim 8, wherein said first receptacle means is substantially rectangular and is formed with a bottom portion and four upstanding outwardly-sloping side portions.

10. The structure defined in claim 8, wherein said first receptacle means apertures are each approximately 9/32 inch square.

11. The structure defined in claim 8, wherein said false bottom means consists of a substantially flat plate portion, an upstanding side portion, and a laterally-extending flanged portion that serves as handle means.

12. The structure defined in claim 8, wherein said false bottom means is configured to closely fit the contours of said first receptacle means.

13. The structure defined in claim 12, wherein said false bottom means is provided with a peripheral gasket means that is adapted to engage an inner surface of said first receptacle means.

14. An animal litter box constructed and arranged to enable the substantially complete removal of both solid and liquid wastes from the unsoiled litter comprising:
- two substantially identical interchangeable nestably stackable animal litter receptacle means, each of said receptacle means having aperture means at the bottom thereof; and,
- two false bottom means adapted to be respectively positioned in said two receptacle means whereby each of said receptacle means and its associated false bottom means is adapted to receive and hold animal litter, each of said false bottom means being constructed and arranged so as to be substantially rigid over that portion thereof that engages and supports said animal litter and made from a material having the necessary adhesive characteristics and configured so that any wetted litter engaging said portion of false bottom means will adhere thereto so that said false bottom means can be removed from its associated receptacle means contents and mechanically worked whereby said wetted litter may be released from said false bottom means and discarded, each of said false bottom means being constructed and arranged so as to be substantially rigid over that portion thereof that engages and supports said animal litter so that said portion of said false bottom means will not flex sufficiently to release said wetted litter during removal of said false bottom means from its said associated receptacle means contents.

15. The structure defined in claim 14, wherein each of said receptacle means is substantially rectangular and is formed with a bottom portion, four upstanding outwardly-sloping side portions, and integral ribs at the bottom thereof.

16. The structure defined in claim 14, wherein each of said receptacle means apertures is approximately 9/32 inch square.

17. The structure defined in claim 14, wherein said false bottom means comprises a substantially flat plate portion, an upstanding side portion, and a laterally-extending flange portion that serves as handle.

18. The structure defined in claim 14, wherein said false bottom means is configured so as to correspond to the inner contours of said receptacle means.

19. The structure defined in claim 18, wherein said false bottom means includes peripheral gasket means at least a portion of which is adapted to engage said inner contours of said receptacle means.

20. An animal litter box constructed and arranged to enable the substantially complete removal of both solid and liquid wastes from the unsoiled litter comprising:
- two substantially identical interchangeable molded plastic nestably stackable animal litter receptacles, each receptacle being substantially rectangular and having a bottom portion, four upstanding outwardly-sloping side portions, integral external ribs projecting from said bottom portion; each receptacle being formed with a plurality of approximately 9/32 inch square apertures; and,
- two plastic false bottoms, each false bottom including a flat plate portion, an upstanding side portion, and a laterally-extending flange portion that serves as a handle; said false bottoms each being configured to fit the contours of said receptacles and including peripheral rubber gasket means; each false bottom adapted to be positioned in an associated one of said receptacles whereby each receptacle and its associated false bottom is adapted to receive and hold animal litter, each said false bottom being constructed and arranged so as to be substantially rigid over that portion thereof that engages and supports said animal litter and made from a material having the necessary adhesive characteristics and configured so that the wetted litter engaging said portion of the false bottom will adhere thereto so that said false bottom can be removed from its associated receptacle contents and mechanically worked whereby said wetted litter may then be released from said false bottom and discarded, each said false bottom being constructed and arranged so as to be substantially rigid over that portion thereof that engages and supports said animal litter so that said portion of said false bottom will not flex sufficiently to release said wetted litter during removal of said false bottom from its associated receptacle's contents.

* * * * *